Patented Dec. 30, 1930

1,787,281

UNITED STATES PATENT OFFICE

ROBERT C. PALMER, OF PENSACOLA, FLORIDA, ASSIGNOR TO THE NEWPORT COMPANY, OF CARROLLVILLE, WISCONSIN, A CORPORATION OF DELAWARE

PROCESS OF TREATING ROSIN AND PRODUCT THEREFROM

No Drawing.   Application filed June 28, 1928.   Serial No. 289,079.

This invention relates to the treatment of rosin in order to overcome certain objections to its use in industry due to its tendency to crystallize instead of remaining in an amorphous state.

In the manufacture of rosin, particularly wood rosin, although also frequently observed in gum rosin, a portion of the abietic acid sometimes has a tendency to crystallize out of the solid mass. When a rosin of this character containing an unusually high proportion of crystalline abietic acid is made into a paper sizing material by a partial neutralization of the abietic acid, it frequently happens that a portion of the material will granulate instead of forming the desired soapy emulsion, thereby rendering it worthless. This is due to the fact that the melting point of the crystalline abietic acid is considerably above the boiling point of water, and since this is usually the maximum temperature attainable in a size-making vat unless closed pressure cookers are used, the abietic acid remains in solid crystalline form. The crystals of abietic acid become coated with the soap, and further neutralization becomes impossible.

I have discovered that this difficulty can be overcome by a very simple but, to the best of my knowledge, novel method. By the treatment hereafter described not only is the abietic acid prevented from crystallizing in the solid rosin, but in subsequent uses of the rosin, such as in the making of paper sizing material or soap, granulation is entirely prevented, even though the neutralization is only partial, as in making what is known to paper manufacturers as a "high free rosin" size.

It is therefore an object of this invention to provide a rosin which in solid form is substantially free of crystalline abietic acid.

Other and further important objects of this invention will become apparent from the following description and appended claims.

This treatment consists of a partial neutralization of the rosin during the course of its manufacture using the common water soluble alkalies, such as sodium or potassium hydroxide, or sodium or potassium carbonate. The amount of neutralization necessary to accomplish the desired effect is comparatively small, in most cases not exceeding 6% of the abietic acid in the rosin and even as low as 2½% is often effective. The presence of a small amount of sodium or potassium abietate probably acts as a protective colloid, as well as reducing the total acidity, and thus prevents crystallization as the rosin becomes a solid. The presence of the water soluble alkali abietate so greatly hastens further neutralization, as in size manufacture, that the desired product is produced before granulation can take place.

An example of my method of treatment is as follows: In the manufacture of wood rosin by the solvent extraction process, the last step in this process is the recovery of the rosin by the evaporation of the solvent. I have found that during the evaporation of the solvent is a convenient point to add the alkali, preferably before the concentration of the rosin in the solvent becomes too high, as a certain amount of time is necessary for the small amount of alkali abietate formed to become thoroughly mixed with the rosin. Sodium hydroxide is, therefore, added in a water solution when about 80% of the solvent has been evaporated.

The manner of adding the alkali is not a feature of this invention. It may be added in a dry state or in water solution, or even in other solvents than water. I have found that a 50% water solution is a simple way that gives the desired homogeneous mixture of rosin and sodium abietate with the greatest manufacturing facility. The amount of sodium hydroxide to be added is determined by first ascertaining the amount of rosin in the rosin solution, and then calculating the amount of caustic soda required to neutralize 6% of the abietic acid. This usually figures 1¼% of the weight of the rosin. After the caustic soda is added, the rosin is recovered free from its solvent in the usual way.

An example of my method of treatment using sodium carbonate (soda ash) is as follows. Owing to the fact that carbon dioxide gas is liberated when sodium carbonate combines with abietic acid, the rosin solution has a tendency to foam. For this reason saturated water solution of sodium carbonate is added very slowly, and while there is a large amount of rosin solvent still present. The sodium abietate thus gradually formed does not go into solution at once, but floats around in the rosin solution until the mass becomes more concentrated, when it is gradually taken up and the whole finally becomes the desired homogeneous mixture of rosin and sodium abietate.

This product when solidified is translucent and clear, and resembles the untreated rosin in physical appearance.

I am aware that the addition of alkali to rosin is not new, but this has not been done heretofore except to make soap or paper sizing material, rosin soaps and the like.

I am also aware that lime has been added to rosin to harden it and reduce its acidity for varnish making and the like, and also that cobalt manganese and lead have been combined with the abietic acid of rosin to give it special properties.

But to the best of my knowledge, it is novel to add a caustic alkali to an original rosin product, that is, rosin in course of preparation or as originally prepared, to form as a new article of commerce, a solid rosin containing a small amount of the water soluble salts, sodium or potassium abietate and closely resembling untreated rosin in physical appearance. The alkali metal abietates greatly increase the stability of the rosin as regards crystallization and improve its working qualities in the subsequent manufacture of soap or paper size.

I am aware that numerous details of the process may be varied through a wide range without departing from the principles of this invention, and I, therefore, do not purpose limiting the patent granted hereon otherwise than necessitated by the prior art.

I claim as my invention:

1. The process of preparing a rosin in solid form substantially free from crystalline abietic acid, which comprises adding to rosin while in a liquid phase an amount of caustic alkali sufficient to neutralize between 2.5 and 6% of the abietic acid content of the rosin to be treated, thereby forming a relatively small quantity of an alkali metal abietate, and allowing the treated rosin to solidify.

2. The process of preparing a rosin in solid form substantially free from crystalline abietic acid, which comprises adding to an original rosin product while in a liquid phase an amount of caustic alkali such as would be required to neutralize approximately 6% of the abietic acid content of the rosin, forming a homogeneous mixture of rosin and abietate and allowing the mixture to solidify.

3. The process of preparing a wood rosin which in solid form is substantially free from crytalline abietic acid, which comprises adding to a solution of wood rosin in a solvent an amount of caustic alkali sufficient to neutralize only a relatively small proportion of the abietic acid in the rosin, freeing the rosin of the solvent and allowing the rosin to solidify.

4. The process of preparing a wood rosin which in solid form is substantially free from crystalline abietic acid, which comprises adding to a solution of wood rosin in a solvent an amount of caustic alkali sufficient to neutralize approximately 6% of the abietic acid in the rosin, freeing the rosin of the solvent and allowing the rosin to solidify.

5. As a new article of manufacture, a solid rosin product substantially free of crystalline abietic acid and containing a relatively small quantity of an alkali metal abietate, the quantity of alkali metal abietate being insufficient to change the normal physical appearance of the rosin.

6. As a new article of manufacture, wood rosin in solid form substantially free of crystalline abietic acid and containing a small percentage of sodium abietate, insufficient in amount to change the normal physical appearance of the rosin.

7. The process of preparing a rosin in solid form substantially free from crystalline abietic acid, which comprises adding to rosin while in a liquid phase a quantity of a caustic alkali metal compound sufficient in amount to convert a relatively small proportion of the abietic acid content of the rosin into alkali metal abietate but insufficient in amount to change the physical appearance of the treated rosin and allowing the treated rosin to assume its normally solid form.

8. As a new article of manufacture, a solid rosin product substantially free of crystalline abietic acid and containing an effective but small quantity of an alkali metal abietate, the amount of abietate being about equivalent to that formed by the neutralization of approximately 6% of the original abietic acid content of the rosin.

9. As a new article of manufacture, a solid rosin product substantially free of crystalline abietic acid and containing an amount of an alkali metal abietate not in excess of the equivalent of that formed by the reaction of 1¼ parts of caustic soda upon 100 parts by weight of rosin.

In testimony whereof I have hereunto subscribed my name at Pensacola, Escambia County, Florida.

ROBERT C. PALMER.